(12) United States Patent
Kong et al.

(10) Patent No.: US 9,551,528 B2
(45) Date of Patent: Jan. 24, 2017

(54) DISPENSING DEVICE FOR WELDING ROD DRYER

(71) Applicant: DOOSAN HEAVY INDUSTRIES & CONSTRUCTION CO., LTD., Changwon-si, Gyeongsangnam-do (KR)

(72) Inventors: Hyun Sang Kong, Changwon-si (KR); Eun Jong Oh, Changwon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 93 days.

(21) Appl. No.: 14/573,836

(22) Filed: Dec. 17, 2014

(65) Prior Publication Data

US 2015/0168063 A1 Jun. 18, 2015

(30) Foreign Application Priority Data

Dec. 18, 2013 (KR) ........................ 10-2013-0158535

(51) Int. Cl.
| | |
|---|---|
| *F26B 9/06* | (2006.01) |
| *B23K 9/32* | (2006.01) |
| *B23K 9/26* | (2006.01) |
| *B25H 3/00* | (2006.01) |
| *F26B 9/00* | (2006.01) |

(52) U.S. Cl.
CPC . *F26B 9/06* (2013.01); *B23K 9/26* (2013.01); *B23K 9/32* (2013.01); *B25H 3/006* (2013.01); *F26B 9/003* (2013.01); *F26B 2210/00* (2013.01)

(58) Field of Classification Search
CPC .................. F26B 3/00; F26B 5/00; F26B 9/00; F26B 9/06; B23K 9/00; B23K 9/24; B23K 9/32

USPC ............... 34/90, 100; 219/133; 432/77, 121
See application file for complete search history.

(56) References Cited

U.S. PATENT DOCUMENTS

| | | | | |
|---|---|---|---|---|
| 2,350,672 A * | 6/1944 | Byron | ..................... | F26B 21/00 |
| | | | | 198/577 |
| 3,489,398 A * | 1/1970 | Hunt | .................... | B23K 35/404 |
| | | | | 34/201 |
| 3,813,213 A * | 5/1974 | Jorneskog | ............ | B23K 35/404 |
| | | | | 432/121 |
| 5,911,487 A * | 6/1999 | Dricken | .................... | F26B 5/04 |
| | | | | 34/92 |
| 6,075,226 A * | 6/2000 | Kishbaugh | ............... | B23K 9/24 |
| | | | | 219/133 |
| 6,219,937 B1* | 4/2001 | Culp | ..................... | F26B 21/004 |
| | | | | 34/218 |
| 6,528,764 B2* | 3/2003 | Podgurski | ................ | B23K 9/32 |
| | | | | 219/133 |
| 6,924,460 B1* | 8/2005 | Stava | ..................... | B23K 9/164 |
| | | | | 219/133 |

(Continued)

FOREIGN PATENT DOCUMENTS

| | | |
|---|---|---|
| CH | 638032 A5 | 8/1983 |
| DE | 29910310 U1 | 6/1999 |

(Continued)

*Primary Examiner* — Stephen M Gravini
(74) *Attorney, Agent, or Firm* — Sughrue Mion, PLLC (57) ABSTRACT

There is provided a dispensing device for a welding rod dryer. The dispensing device may include a plurality of chambers configured to receive welding rod dryers; and a connection member provided in each of the plurality of chambers and configured to supply power to the welding dryers; and a door provided at an entrance of each of the plurality of chambers.

20 Claims, 5 Drawing Sheets (56) References Cited

U.S. PATENT DOCUMENTS

2015/0168063 A1* 6/2015 Kong ..................... F26B 9/06
                                                            34/107

FOREIGN PATENT DOCUMENTS

| DE | 202006006702 U1 | 7/2006 |
| DE | 102011009898 A1 | 8/2012 |
| GB | 553171 A * | 5/1943 | ......... B23K 35/3612 |
| JP | 2002-303445 A | 10/2002 |
| JP | 2003-25070 A | 12/2003 |
| KR | 20-0131734 | 9/1998 |
| KR | 20-0218613 Y1 | 4/2001 |
| KR | 20-0248562 Y1 | 10/2001 |
| KR | 10-0368468 | 1/2003 |
| KR | 10-2013-0093282 A | 8/2013 |
| KR | 101348390 B1 * | 1/2014 |
| KR | 101469415 B1 * | 12/2014 |

* cited by examiner

DISPENSING DEVICE FOR WELDING ROD DRYER

CROSS-REFERENCE TO RELATED APPLICATION

This application claims priority to Korean Patent Application No. 10-2013-0158535, filed on Dec. 18, 2013 the disclosure of which is incorporated herein by reference in its entirety.

BACKGROUND

1. Field

Apparatuses consistent with exemplary embodiments relate to a dispensing device for a welding rod dryer, and more particularly, to a dispensing device for a welding rod dryer, in which the welding rod dryer can be maintained at a predetermined temperature in the state that the welding rod dryer receives a welding rod without being stored separately from the welding rod, and many welding operators can rapidly dispense welding rod dryers at a time without difficulty and inconveniences.

2. Description of the Related Art

Shielded metal arc welding (SMAW) is a technology first developed among arc welding technologies, and one of the technologies that have been most extensively used until now.

According to the SMAW, an arc is generated between an electrode rod formed by coating a core with a cladding material and a base material for the welding work. The SMAW has been extensively used to mainly perform a welding work for mild steel, low alloy steel, stainless steel, or cast iron. In addition, since the SMAW has no special limitation in the thickness of a structure to be welded or a welding posture of a welding operator, the SMAW has been widely employed in shipbuilding, bridge, construction, and petroleum refining industries.

A welding rod used in the SMAW is formed by coating a cladding material on an outer circumference of a metallic rod for generating an arc. If the cladding material of the welding rod is stripped or the welding rod becomes wet with moisture, the welding rod may not be operational, or the arc cannot be smoothly generated, so that a difficult situation in the use of the welding rod may frequently occur.

Therefore, when the welding rod is stored, there is required a special caution of preventing the cladding material from being stripped or preventing the welding rod from becoming wet with moisture.

Meanwhile, when storing the portable welding rod dryer, a welding rod remaining after the use thereof is separated from the welding rod dryer and put into a drying oven for the storage thereof, and the portable welding rod dryer is stacked and stored in a typical shelf.

Accordingly, in the case of heavy industry fields, delay time is significantly taken until many welding operators select and receive their respective welding rod dryers at a time. In other words, predetermined time is required to preheat the portable welding rod dryer, and the welding operation must significantly and inconveniently be delayed for the welding rod dryer for time ranging from several tens of minutes to several hours.

Accordingly, not only is too much time wasted, but also manpower of many welding operators is remarkably wasted. Further, since the welding rod stored in the drying oven must be drawn from the drying oven and received in the portable welding rod dryer again even though the heating of the portable welding rod dryer has been finished, procedures are remarkably complex and inconvenient.

SUMMARY

One or more exemplary embodiments provide a dispensing device for a welding rod dryer, in which the welding rod dryer can be maintained at a predetermined temperature in the state that the welding rod dryer receives a welding rod without being stored separately from the welding rod, and many welding operators can rapidly dispense welding rod dryers at a time without difficulty and inconveniences.

One or more exemplary embodiments also provide a dispensing device for a welding rod dryer, capable of smoothly connecting the welding rod dryers with each other for the use of the welding rod dryers regardless of the shape of a connection terminal of the welding rod dryer.

One or more exemplary embodiments provide a dispensing device for a welding rod dryer, which can be smoothly used in the form of a single unit.

According to one aspect of an exemplary embodiment, there is provided a dispensing device for a welding rod dryer. The dispensing device may include a plurality of chambers configured to receive welding rod dryers; and a connection member provided in each of the plurality of chambers and configured to supply power to the welding dryers; and a door provided at an entrance of each of the plurality of chambers.

The dispensing device may further include a timer configured to set power supply time to the welding rod dryer in the plurality of chambers.

The timer may include a single timer configured to set the power supply time to the plurality chambers of the cabinet, or an individual timer provided in each of the plurality of chambers.

Each welding rod dryer may include an internal timer configured to set power supply time for the welding rod dryer.

The connection member may include a plurality of connection parts configured to selectively connect to supply the power to the welding dryers according to a shape of a connection terminal of the welding rod dryer.

The connection part may include at least one of a ground-type connection part and an outlet-type connection part.

The plurality of chambers may include circuit breakers according to a number of the plurality of chambers.

The dispensing device may further include a dispensing card storing member provided in each of the plurality of chambers and configured to determine a dispensing state of the welding rod dryer received in a respective chamber.

The dispensing device may further include a sensor provided in each chamber and configured to sense a receiving state of the welding rod dryer.

The dispensing device may further include an alarm unit provided on the cabinet or in the chamber and configured to determine a state of the cabinet or the chamber.

The dispensing device may further include a locking unit provided on a front surface of the door or the cabinet for a locking operation.

According to an aspect of another exemplary embodiment, there is provided a dispensing device for a welding rod dryer. The dispensing device includes a plurality of module-type bodies, wherein a first module-type body of the plurality of module-type bodies may include: a chamber receiving a welding rod dryer; and a connection member provided in the chamber and configured to supply power to the welding rod dryer; and a door provided at an entrance of the chamber, and wherein the module-type body comprises a coupling unit provided on at least one surface and configured to couple with a second module-type body of the plurality of module-type bodies.

The dispensing device may further include a connection unit provided on the least one surface of the first module-type body and configured to provide electrical connection with the second module-type body.

The dispensing device may further include a support member provided in the first module-type body and coupled to the coupling unit provided at the at least one surface of the first module-type body.

The dispensing device may further include a timer provided in the chamber and configured to set power supply time to the welding rod dryer.

The timer may include a single timer configured to set the power supply time for the plurality of module-type bodies included in a unit, or an individual timer provided in each of the plurality of module-type bodies.

The dispensing device may further include a sensor provided in the chamber and configured to sense a receiving state of the welding rod dryer.

The dispensing device may further include a circuit breaker provided in the chamber.

The dispensing device may further include a locking unit provided on a front surface of the module-type body or the door for a locking operation.

The plurality of module-type bodies are assembled in a form of a single unit by the coupling unit and a support member.

As described above, according to exemplary embodiments, the welding rod dryer can be maintained at a predetermined temperature in the state that the welding rod dryer receives a welding rod without being stored separately from the welding rod, and many welding operators can rapidly dispense welding rod dryers at a time without difficulty and inconveniences. Accordingly, the welding rod dryers can be dispensed within the shortest period of time, so that the high economical effects can be obtained.

In addition, the welding rod received in the dispensed welding rod direr can be welded under the superior condition, so that the efficiency of the welding work can be improved.

Further, the welding rod dryers can be smoothly connected with each other regardless of the shape of the connection terminal thereof, so that superior compatibility can be represented regardless of the connection terminals of the welding rod dryers.

In addition, the dispensing device can be smoothly used in the form of a single unit, so that the dispensing device can be assembled in appropriate size according to the working conditions or the installation space. Accordingly the space utilization can be optimized and maximized.

DETAILED DESCRIPTION

Hereinafter, exemplary embodiments will be described in more detail with reference to accompanying drawings.

Figure 1:
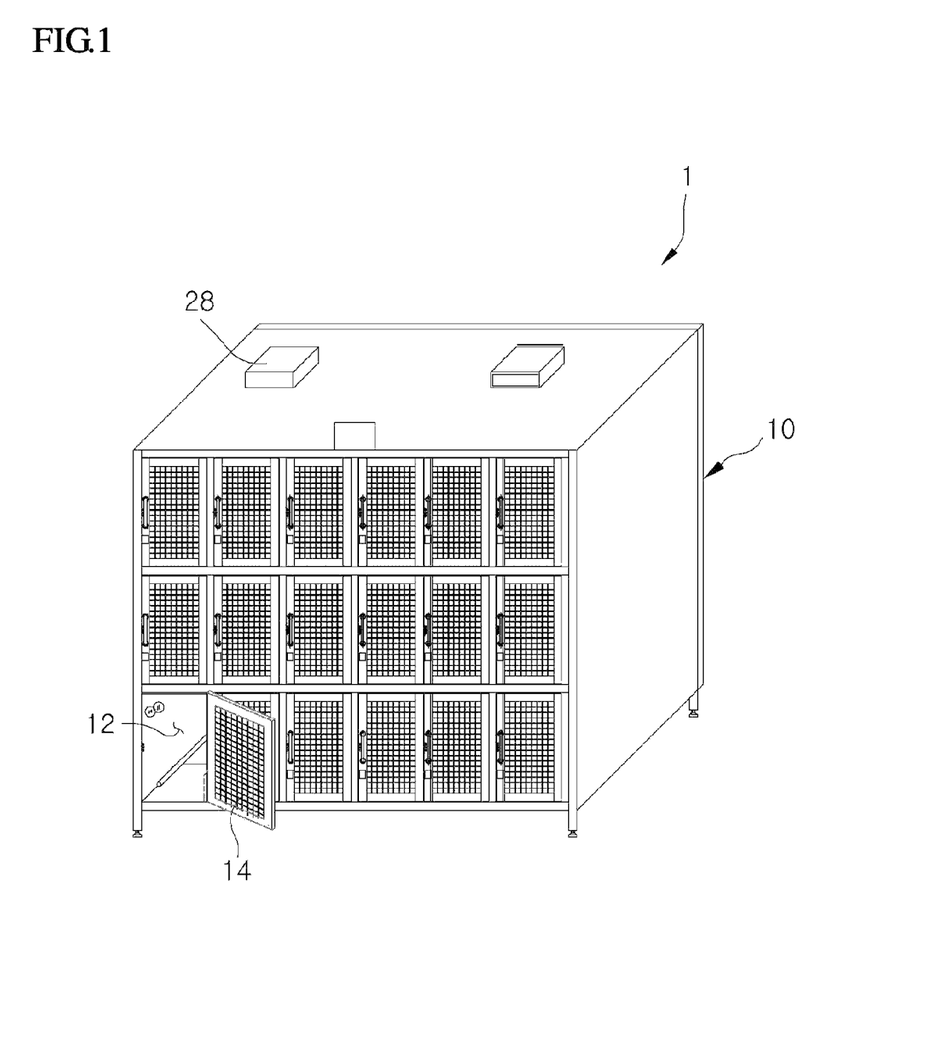
FIG. 1 is a perspective view showing an entire structure of a dispensing device according to an exemplary embodiment.
Figure 2:
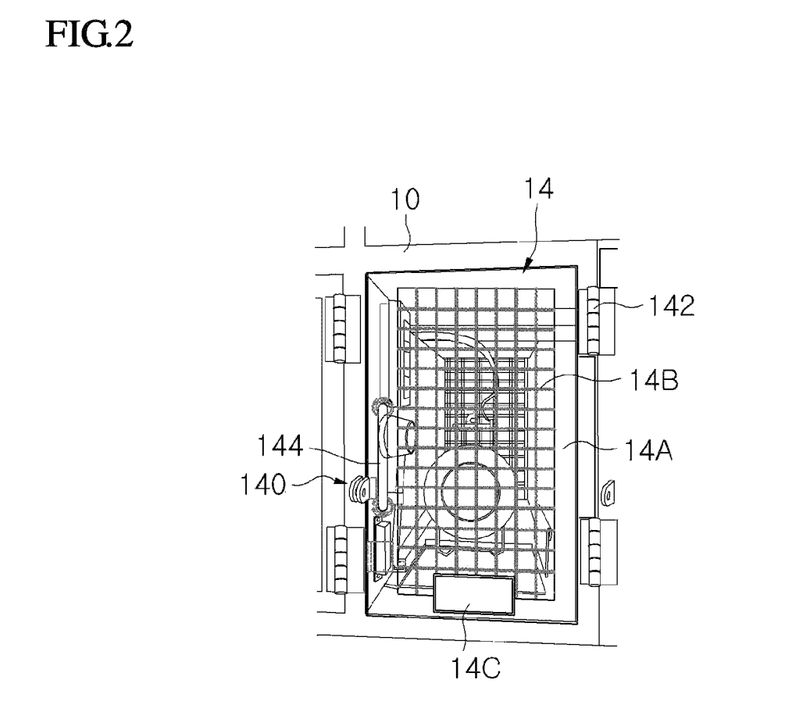
FIG. 2 is a partially enlarged view showing a chamber having a door in a closed state according to an exemplary embodiment.
Figure 3:
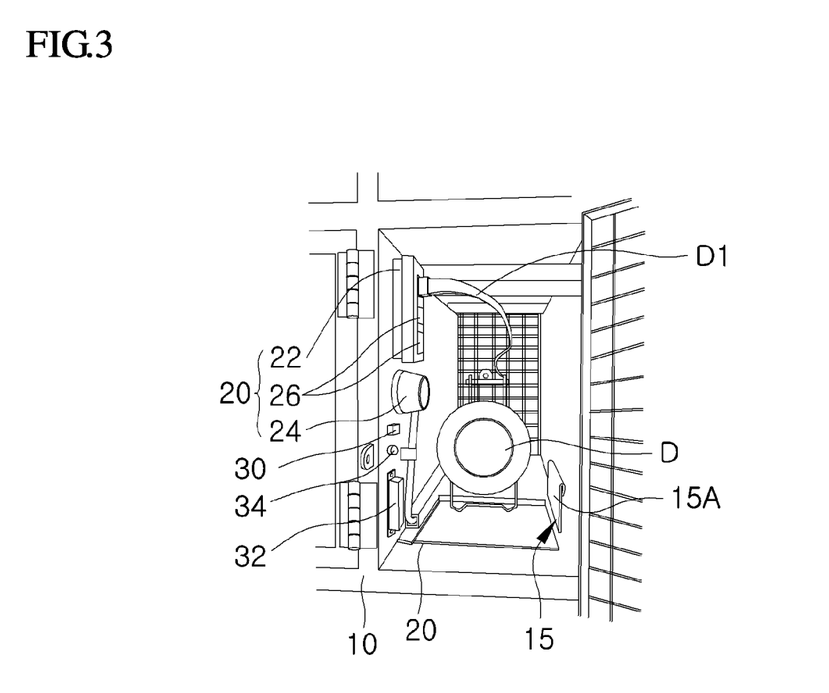
FIG. 3 is a partially enlarged view showing the chamber having the door in an open state an exemplary embodiment.

FIG. 1 is a perspective view showing an entire structure of a dispensing device 1 according to an exemplary embodiment. FIG. 2 is a partially enlarged view showing a chamber 12 having a door 14 in a closed state according to an exemplary embodiment. FIG. 3 is a partially enlarged view showing the chamber 12 having the door 14 in an open state according to an exemplary embodiment.

As shown in figures, provided is a dispensing device 1 capable of simultaneously dispensing a great number of welding rod dryers D generally known to those skilled in the art, as a device for receiving a welding rod (not shown), and preheating the welding rod for the use of the welding rod to prevent a cladding material of the welding rod from being stripped or wet with moisture.

According to the exemplary embodiment, the welding rod dryer can be maintained at a predetermined temperature in the state that the welding rod dryer receives a welding rod without being stored separately from the welding rod, and many welding operators can rapidly dispense welding rod dryers at a time without difficulty and inconveniences.

The dispensing device 1 according to the exemplary includes a cabinet 10 including a plurality of chambers 12 that receive and encase welding rod dryers D, respectively, and the plurality of chambers are provided therein with respective connection members 20 to supply power so that the welding dryers D can be preheated; and a door 14 provided at an entrance of the chamber 12 and opened/closed through a typical hinged door scheme. The cabinet 10 has a predetermined width and length so that the plurality of chambers 12 in which the welding rod dryers D are received and encased may be provided as many as possible. The cabinet 10 is provided on a top surface thereof with a transferring member (not shown), such as a typical eye bolt, to transfer the welding rod dryer D.

In other words, welding rod dryers are not stored in a plurality of chambers included in a cabinet separately from welding rods, but welding rod dryers having welding rods received therein are individually received and preheated in the chambers, respectively. Accordingly, since facilities to store the welding rods and the welding rod dryers are not required differently as from the related art, the space utilization can be optimized and maximized.

In addition, the welding rod dryers D are individually provided into the chambers, which is included in the cabinet, respectively and preheated, so that many welding operators can rapidly dispense the welding rod dryers without a waiting time when the welding rod dryers are dispensed.

Accordingly, differently from the related art, the waste of time and manpower can be minimized, so that a high economical effect can be obtained, and the efficiency of a welding work can be enhanced since the welding rod can be instantly used after the welding rod is dispensed.

The chambers 12 further include a timer 30 to set power supply time to the welding rod dryer D, that is, to adjust time to preheat the welding rod dryer D. In the exemplary embodiment, a single timer is provided for all chambers 12 provided in the cabinet 10, that is, one timer is provided for the cabinet 10. However, the exemplary embodiment is not limited thereto. That is, an individual timer may be provided for each chamber 12 of the cabinet 10. In addition, the welding rod dryer D may include an internal timer thereof. The timer is preferably provided in the connection member 20.

Accordingly, the welding rod dryer D received and encased in the chamber 12 can be appropriately preheated for a time set by the timer 30 and can be smoothly preheated in time to dispense the welding rod dryer D.

The connection member 20 includes a plurality of connection parts 22 and 24 so that the connection member 20 can be selectively connected to a connection terminal D1 of the welding rod dryer D according to a shape of the connection terminal D1 of the welding rod dryer D. The connection parts 22 and 24 may include at least one of a ground-type connection part 22 and an outlet-type connection part 24.

In other words, the connection terminal D1 provided in the welding rod dryer D may be provided in the form of typical ground-type pin and plug according to a field condition of a working place. However, the ground-type connection part and the outlet-type connection part are provided in one connection member so that the connection member can be used regardless of the shape of the connection terminal D1. Accordingly, the use convenience and superior compatibility can be provided.

In addition, as the connection member 20 includes a power switch (not shown), such as a typical on/off switch, to apply electricity, and an indication lamp 26 to indicate the operating state of the power switch so that an operator can determine the operating state of the power switch with naked eyes of the operator, the operator can easily determine a power on/off state through the indication lamp 26.

In addition, circuit breakers 28 are provided on the top surface of the cabinet 10 or in the chambers 12 according to the number of the chambers 12 for the safe use when an abnormal situation, such as overvoltage or overcurrent, electrically occurs in the process of preheating the welding rod dryers D. In this case, the circuit breaker may be used by simultaneously connecting several chambers with each other according to design conditions.

In addition, a dispensing card storing member 15 is further provided in the chamber 12 to determine a dispensing state of the welding rod dryer D received in the chamber 12. The dispensing card storing member 15 is provided in the form of a partition 15A perpendicularly formed to a bottom surface of the chamber 12 so that a dispensing card (not shown) may be disposed in an upright state at one side of the chamber 12.

Accordingly, an operator can simply and conveniently determine the dispensing state of the welding rod dryer D stored in the chamber 12.

In addition, a sensor 32 is further provided in the chamber 12 to sense the receiving state of the welding rod dryer D. The sensor 32 may take in various forms of sensors, such as a weight sensor, an optical sensor, or a contact sensor, which is generally known to those skilled in the art, to sense the receiving state of the welding rod dryer D when the welding rod dryer D is received in the chamber 12. In this case, the sensor is connected with a typical control unit to sense the receiving state of the welding rod dryer so that a signal is transmitted to an operator or a central control unit or the receiving state is displayed.

Accordingly, the operator can simply and conveniently determine if the welding rod dryer D to be stored and preheated is received normally in the chamber 12.

In addition, an alarm unit 34 is further provided on the cabinet 10 or in the chamber 12 to determine if the cabinet 10 or the chamber 12 is in a normal state. The alarm unit 34 may include one of various alarm units connected with the control unit, which is generally known to those skilled in the art, to make an alarm sound through a typical speaker, or to notify the operator of the receiving state and the preheating state of the welding rod dryer D or the supply state of electricity through a screen serving as a display unit. In addition, preferably, the alarm unit 34 is realized in such a manner that the alarm unit 34 is connected with the generally-known control unit and components, such as the connection member 20, the circuit breaker 28, the indication lamp 26, or the sensor 32, related to the dispensing state or the preheating state of the welding rod dryer to perform an alarm function.

Referring to FIG. 2, a locking unit 140 is provided on front surfaces of the door 14 and the cabinet 10 making contact with the door 14 for the purpose of the safety and the prohibition on uses other than the use by an operator. In other words, the locking unit 140 is a typical locking chain used to lock the door 14 and the front surface of the cabinet 10 making contact with the door 14 when the door 14 is closed, and serves as a unit for operator restriction.

In addition, the door 14 has a plurality of hinge parts 142 so that one side of the door 14 is rotatable. In addition, the door 14 has a handle 144 provided in an opposite side to the hinge parts 142 so that the user may more easily open the door 14.

In addition, the door 14 includes a frame 14a, on which the hinge parts 142 and the handle 144 are provided, and a mesh part 14B allowing the user to view the chamber inward of the frame 14A and allowing the ventilation of the chamber.

A display member 14C is further provided on a front surface of the door 14 to display items related to the chamber 12. In other words, the display member 14C is used to verify an identity of a welding operator so that only the verified welding operation may access the chamber 12.

In addition, a plurality of cabinets 10 may be consecutively coupled to one another vertically or horizontally by typical coupling units, such as brackets, bolts, and nuts, according to occasions so that a great number of welding rod dryers may be stored.

Figure 4:
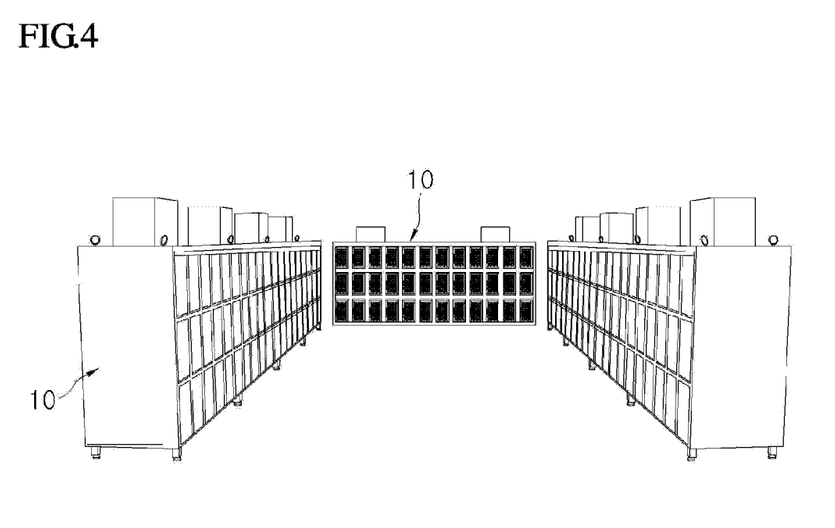
FIG. 4 is a perspective view showing the arrangement of cabinets according to an exemplary embodiment.

As shown in FIG. 4, the plurality of cabinets 10 are arranged in the state that doors face each other and a front or a rear thereof while making a passage, so that a space can be utilized as much as possible. In other words, the plurality of cabinets 10 are arranged in a substantially C shape, so that the maximum number of welding rod dryers D can be stored in the minimum space.

Therefore, even if much manpower is simultaneously mobilized when the welding rod dryers are dispensed, the welding rod dryers can be smoothly dispensed without further delay. Further, high space utilization can be efficiently acquired.

Figure 5:
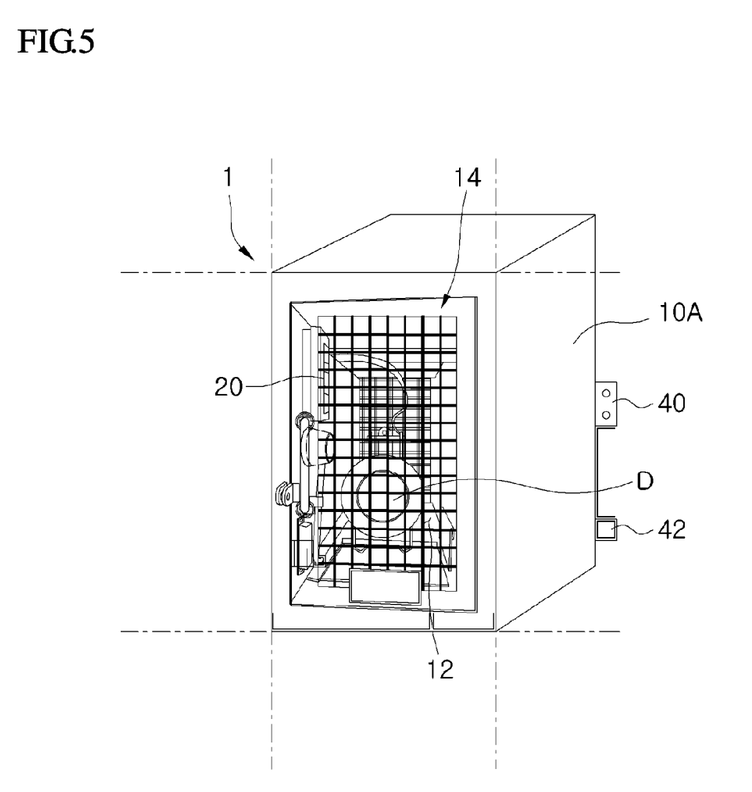
FIG. 5 is a partially exploded perspective view showing a dispensing device according to another exemplary embodiment.

FIG. 5 is a perspective view showing a dispensing device 1 according to another exemplary embodiment.

As shown in FIG. 5, a single type of a dispensing device 1 is not manufactured. That is, the dispensing device is manufactured as a single module instead of being manufactured as a cabinet having a plurality of chambers, so that the minimum number of dispensing devices including one dispensing device to several tens of dispensing devices can be installed according to the working field conditions, a working space, or working conditions. In addition, the same reference numerals will be assigned to the same elements in a technical configuration the same as that described above.

The dispensing device 1 according to the exemplary embodiment includes a plurality of module-type bodies 10A. Each module-type body 10A includes a single chamber 12 receiving and encasing a welding rod dryer D. The chamber is provided with a connection member 20 to supply power to the welding rod dryer D and a door 14 provided at an entrance of the chamber 12. The module-type body 10A is provided on at least one surface thereof with a typical coupling unit 38A, such as a bracket, a bolt, and a nut, for the coupling with another module-type body 10A.

The module-type body 10A typically has a rectangular parallelepiped shape to receive only one welding rod dryer D. Different from the related art, the welding rod dryer D is not stored separately from a welding rod, but stored and preheated together with the welding rod in the state that the welding rod is inserted into the welding rod dryer D.

Therefore, the module-type body 10A can be conveniently stored in a place individually desired by an operator.

Meanwhile, a plurality of module-type bodies 10A may be provided and united by typical coupling units according to installation conditions or fields. The term "module-type body" refers to the form of a single body, and the term "unit" refers to a combined form obtained by coupling single bodies to each other.

In other words, the module-type bodies 10A are vertically stacked on each other or horizontally coupled to each other by the coupling unit so that the module-type bodies 10A are united as a small unit for the use according to the installation conditions or the fields. Therefore, the module-type bodies may represent high practicality and high compatibility.

Further, the coupling unit may be realized in various shapes that are generally known to those skilled in the art. For example, the coupling unit can stack the multi-type bodies on each other or horizontally couple the multi-type bodies to each other by using a plurality of brackets or bolts and nuts.

In addition, the coupling unit may be provided in the form of a typical coupling protrusion or a typical coupling groove. The multi-type bodies may be stacked on each other or horizontally coupled with each other by forming the coupling protrusion and the coupling groove at corresponding positions of the multi-type bodies.

In addition to the coupling unit, various units, which are generally known to those skilled in the art, may be used to vertically and horizontally couple the module-type bodies to each other.

Therefore, the module-type bodies are coupled to each other in necessary number by the coupling unit for the use according to the installation conditions or the field conditions of the working place. Accordingly, the module-type bodies may be assembled in appropriate size regardless of working conditions, so that a user can conveniently use the module-type bodies.

A typical connection unit 40A is further provided on one surface of the module-type body 10A having the coupling unit so that the module-type body 10A can be electrically connected with another module-type body 10A. The connection units, such as a typical terminal and a connection terminal box, or a connection port and a connection box, preferably have a shape based on engagement for electrical connection and may typically include an outlet and a plug.

In addition, the module-type body 10A further include typical support members (not shown), such as typical brackets, rubber packing, or rolling wheels, engaged with the coupling unit provided on one surface of the module-type body 10A to safely and stably stack module-type bodies 10A.

Therefore, the module-type bodies 10A can be easily assembled in the form of a single unit required according to the field condition or the installation space by the coupling unit and the support member.

Meanwhile, the module-type body includes the timer to set power supply time for the welding rod dryer, the sensor, and the alarm unit, and the details thereof will be omitted since the above components have been described in the previous exemplary embodiments.

While exemplary embodiments have been particularly shown and described above, it would be appreciated by those skilled in the art that various changes may be made therein without departing from the scope and spirit of the present inventive concept as defined by the following claims.

What is claimed is:

1. A dispensing device for a welding rod dryer, the dispensing device comprising a cabinet comprising:
   a plurality of chambers configured to receive welding rod dryers;
   a connection member provided in each of the plurality of chambers and connected to a connection terminal of a welding rod drier of the welding rod driers to supply electrical power to the welding rod dryer; and
   a door provided at an entrance of each of the plurality of chambers.

2. A dispensing device for a welding rod dryer, the dispensing device comprising a cabinet comprising:
   a plurality of chambers configured to receive welding rod dryers;
   a door provided at an entrance of each chamber; and
   at least one of a timer configured to set power supply time to the welding rod dryer in the plurality of chambers and a sensor provided in each chamber and configured to sense a receiving state of the welding rod dryer.

3. The dispensing device of claim 2, wherein the timer comprises a single timer configured to set the power supply time to the plurality chambers of the cabinet, or an individual timer provided in each of the plurality of chambers.

4. The dispensing device of claim 1, wherein the welding rod dryer comprises an internal timer configured to set power supply time for the welding rod dryer.

5. The dispensing device of claim 1, wherein the connection member comprises a plurality of connection parts configured to selectively connect to supply the power to the welding rod dryers according to a shape of a connection terminal of the welding rod dryer.

6. The dispensing device of claim 5, wherein the connection part comprises at least one of a ground-type connection part and an outlet-type connection part.

7. The dispensing device of claim 1, wherein the plurality of chambers comprise circuit breakers according to a number of the plurality of chambers.

8. The dispensing device of claim 1, further comprising a dispensing card storing member provided in each of the plurality of chambers and configured to determine a dispensing state of the welding rod dryer received in a respective chamber.

9. The dispensing device of claim 1, further comprising a sensor provided in each chamber and configured to sense a receiving state of the welding rod dryer.

10. The dispensing device of claim 1, further comprising an alarm unit provided on the cabinet or in the chamber and configured to determine a state of the cabinet or the chamber.

11. The dispensing device of claim 1, further comprising a locking unit provided on a front surface of the door or the cabinet for a locking operation.

12. A dispensing device for a welding rod dryer, the dispensing device comprising a plurality of module-type bodies,
  wherein a first module-type body of the plurality of module-type bodies comprises:
    a chamber receiving a welding rod dryer; and
    a connection member provided in the chamber and configured to supply power to the welding rod dryer; and
    a door provided at an entrance of the chamber, and
  wherein the first module-type body comprises a coupling unit provided on at least one surface and configured to couple with a second module-type body of the plurality of module-type bodies.

13. The dispensing device of claim 12, further comprising a connection unit provided on the least one surface of the first module-type body and configured to provide electrical connection with the second module-type body.

14. The dispensing device of claim 12, further comprising a support member provided in the first module-type body and coupled to the coupling unit provided at the at least one surface of the first module-type body.

15. The dispensing device of claim 12, further comprising a timer provided in the chamber and configured to set power supply time to the welding rod dryer.

16. The dispensing device of claim 15, wherein the timer comprises a single timer configured to set the power supply time for the plurality of module-type bodies included in a unit, or an individual timer provided in each of the plurality of module-type bodies.

17. The dispensing device of claim 12, further comprising a sensor provided in the chamber and configured to sense a receiving state of the welding rod dryer.

18. The dispensing device of claim 12, further comprising a circuit breaker provided in the chamber.

19. The dispensing device of claim 12, further comprising a locking unit provided on a front surface of the module-type body or the door for a locking operation.

20. The dispensing device of claim 12, wherein the plurality of module-type bodies are assembled in a form of a single unit by the coupling unit and a support member.

* * * * *